United States Patent
Iwao

(10) Patent No.: US 8,240,835 B2
(45) Date of Patent: Aug. 14, 2012

(54) INKJET RECORDING APPARATUS

(75) Inventor: Naoto Iwao, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 563 days.

(21) Appl. No.: 12/402,462

(22) Filed: Mar. 11, 2009

(65) Prior Publication Data

US 2009/0231369 A1    Sep. 17, 2009

(30) Foreign Application Priority Data

Mar. 12, 2008    (JP) ................................. 2008-062944

(51) Int. Cl.
*B41J 2/01* (2006.01)

(52) U.S. Cl. ............................ 347/100; 347/95; 347/98

(58) Field of Classification Search .................... 347/95, 347/96, 98, 100
See application file for complete search history.

(56) References Cited

U.S. PATENT DOCUMENTS

| | | | |
|---|---|---|---|
| 6,120,141 A | | 9/2000 | Tajika et al. |
| 6,322,187 B1 | | 11/2001 | Wyble |
| 6,428,143 B2 * | | 8/2002 | Irihara et al. ................... 347/43 |
| 6,550,882 B2 | | 4/2003 | Koitabashi et al. |
| 2004/0100542 A1 | | 5/2004 | Chen et al. |
| 2006/0098068 A1 | | 5/2006 | Hakamada et al. |
| 2008/0024580 A1 | | 1/2008 | Nakayama |

FOREIGN PATENT DOCUMENTS

| | | |
|---|---|---|
| EP | 1118468 A2 | 7/2001 |
| EP | 1422065 A1 | 5/2004 |
| EP | 1762598 A1 | 3/2007 |
| JP | H02-175253 A | 7/1990 |
| JP | H08-281929 A | 10/1996 |
| JP | H09-277507 A | 10/1997 |
| JP | H10-278242 A | 10/1998 |
| JP | 2002-154196 A | 5/2002 |
| JP | 2008-030930 A | 2/2008 |

OTHER PUBLICATIONS

European Patent Office; European Search Report for European Patent Application No. 09003535.3 (counterpart to the above-captioned U.S. patent application) mailed Jan. 13, 2010.

Japan Patent Office, Notification of Reason for Refusal for Japanese Patent Application No. 2008-062944 (counterpart to above-captioned patent application), dispatched Feb. 7, 2012.

* cited by examiner

*Primary Examiner* — Matthew Luu
*Assistant Examiner* — Rut Patel
(74) *Attorney, Agent, or Firm* — Baker Botts L.L.P.

(57) ABSTRACT

A inkjet recording apparatus includes a first inkjet head which ejects color ink having one of a hydrophobic property and an aqueous property; a second inkjet head which ejects colorless ink having the remaining the other property; and an ejection controller which controls the first inkjet head to eject the color ink on an image region and controls the second inkjet head to eject the colorless ink on an ejection region contacting the image region with a boundary therebetween. The ejection controller controls the first and second inkjet heads so that the colorless ink ejected from the second inkjet head reaches a second minute segment in the ejection region, the second minute segment adjacent to a first minute segment in the image region with the boundary interposed therebetween, before the color ink ejected from the first inkjet head reaches the first minute segment in the image region.

17 Claims, 7 Drawing Sheets

INKJET RECORDING APPARATUS

CROSS-REFERENCE TO RELATED APPLICATION

This application claims priority from Japanese Patent Application No. 2008-062944, filed on Mar. 12, 2008, the entire subject matter of which is incorporated herein by reference.

TECHNICAL FIELD

Aspects of the present invention relate to an inkjet recording apparatus.

BACKGROUND

A related-art inkjet recording apparatus forms an image on a recording medium, such as a sheet, by ejecting ink. Such an inkjet recording apparatus has been desired to achieve both an increase in print processing capability; namely, an output speed, and formation of a sharp and clear image. In order to improve print processing capability, it is necessary to reduce or prevent ink previously reached a sheet from adhering to ink subsequently reaching the sheet by causing a sheet with ejected ink to dry quickly. For this purpose, it is advantageous to use ink that is quickly soaked in a sheet; that is, permeable ink having a high quick-drying property.

If highly-permeable ink reaches a plain sheet, ink permeates through the sheet more than required, whereupon a less-sharp image with a noticeable ink stain is formed. When less-permeable ink is used to avoid such a problem, it takes much time to dry the sheet, which practically prevents improvement of print processing capability.

SUMMARY

According to an aspect of the present invention, there is provided an inkjet recording apparatus which can achieve both improvement of print processing capability and formation of a sharp and clear image.

According to an exemplary embodiment of the present invention, there is provided an inkjet recording apparatus comprising: a first inkjet head which ejects color ink having one of a hydrophobic property and an aqueous property; a second inkjet head which ejects colorless ink having the other one of the hydrophobic property and the aqueous property; and an ejection controller which controls the first inkjet head to eject the color ink on an image region of a recording medium and controls the second inkjet head to eject the colorless ink on an ejection region contacting the image region with a boundary therebetween. The ejection controller controls the first and second inkjet heads so that the colorless ink ejected from the second inkjet head reaches a second minute segment in the ejection region, the second minute segment adjacent to a first minute segment in the image region with the boundary interposed therebetween, before the color ink ejected from the first inkjet head reaches the first minute segment in the image region.

According to another exemplary embodiment of the present invention, there is provided an inkjet recording apparatus comprising: a first inkjet head which ejects color ink having one of a hydrophobic property and an aqueous property; a second inkjet head which ejects colorless ink having the other one of the hydrophobic property and the aqueous property; and an ejection controller which controls the first inkjet head to eject the color ink on an image region of a recording medium and controls the second inkjet head to eject the colorless ink on an ejection region along a contour of the image region. The ejection controller controls the second inkjet head to eject the colorless ink on a segment in the ejection region earlier than the first inkjet head ejecting the color ink on a segment in the image region, adjacent to the segment in the ejection region.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Exemplary embodiments of the present invention will be described with reference to the drawings.

Figure 1:
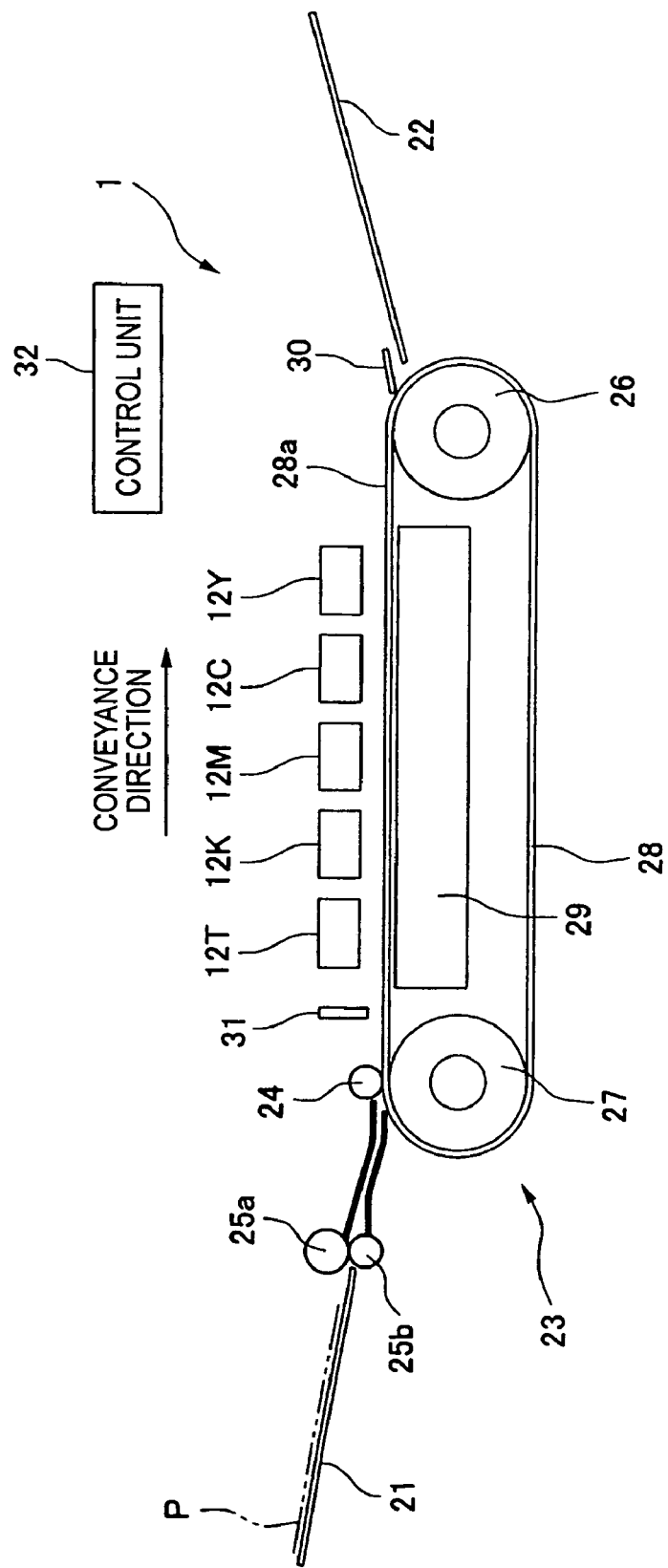
FIG. 1 is a side view of an inkjet printer according to an exemplary embodiment of the present invention.

FIG. 1 shows an inkjet printer 1 according to an exemplary embodiment of the present invention. The inkjet printer 1 includes five inkjet heads 12T, 12K, 12M, 12C, and 12Y that are structurally identical with each other. The inkjet head 12T ejects colorless ink. The colorless ink has hydrophobic property. The other four inkjet heads 12K, 12M, 12C, and 12Y eject different four color ink (black, magenta, cyan, and yellow), respectively. Each of the four color ink has aqueous property.

The inkjet printer 1 includes a sheet feeding tray 21 on the left side in the drawing and a sheet discharge tray 22 on the right side. A conveyance path along which a sheet P as a recording medium is conveyed is formed in the inkjet printer 1 from a sheet feed tray 21 to a sheet discharge tray 22. A pair of feed rollers 25a and 25b that nip and convey a sheet are provided at immediately downstream position of the sheet feed tray 21. The pair of feed rollers 25a and 25b feed the sheet P from the sheet feed tray 21 to the right in the drawing. The feed roller 25a is rotationally driven by a motor 52 (see FIG. 2).

A belt conveyance mechanism 23 provided at an intermediate position on the conveyance path. The belt conveyance mechanism 23 includes two belt rollers 26 and 27; an endless conveyance belt 28 wound around the rollers 26 and 27; and a platen 29 placed within an area surrounded by the conveyance belt 28 and opposing five inkjet heads 12T, 12K, 12M, 12C, and 12Y with the conveyance belt 28 interposed therebetween. The platen 29 supports the conveyance belt 28 so as to prevent the conveyance belt 28 from bending downwardly in an area opposing the five inkjet heads 12T, 12K, 12M, 12C, and 12Y.

A nip roller 24 is disposed above the belt roller 27. The nip roller 24 presses the sheet P fed from the sheet feed tray 21 by the feed rollers 25a and 25b against a peripheral surface of the conveyance belt 28.

A motor 51 (see FIG. 2) rotates the belt roller 26 serving as a drive roller, whereupon the conveyance belt 28 is rotated. The conveyance belt 28 thus conveys the sheet P, which is pressed against the outer peripheral surface of the conveyance belt by the nip roller 24, toward the sheet discharge tray 22 while adhesively holding the sheet. A non-adhesive silicon resin layer is formed over the peripheral surface of the conveyance belt 28. A separation plate 30 is provided at a downstream position of the conveyance belt 28 along the conveyance path. The separation plate 30 separates the sheet P adhering to the peripheral surface of the conveyance belt 28 from the peripheral surface.

The five inkjet heads 12T, 12K, 12M, 12C, and 12Y are arranged along the conveyance direction of the sheet P and fixed at respective positions opposing the platen 29. That is, the inkjet printer 1 is so-called line type. Each of the five inkjet heads 12T, 12K, 12M, 12C, and 12Y has a rectangular shape that is long in a direction orthogonal to the drawing sheet of FIG. 1; that is, in a main scan direction which is orthogonal to the conveyance direction. A bottom surface of each of the inkjet heads includes an ejection plane which opposes a conveyance surface 28a at an upper position on the outer peripheral surface of the conveyance belt 28, and which has a plurality of ejection ports.

In each of the inkjet heads, the plurality of ejection ports are two-dimensionally arranged. An interval between the ejection ports in the ejection plane with respect to the main scan direction corresponds to an interval equivalent to a print resolution in the main scan direction. Each of the five inkjet heads 12T, 12K, 12M, 12C, and 12Y is provided with a plurality of actuators (not shown). The plurality of actuators are provided correspondingly to the plurality of ejection ports in a one-to-one relationship. When an actuator becomes active in a print cycle, ink is ejected from an ejection port corresponding to the actuator. In each print cycle, which actuator becomes active is determined according to drive data supplied to the inkjet heads. The word "print cycle" means a time required when the sheet P is conveyed over a unit distance corresponding to a print resolution in a sub-scan direction (conveyance direction) orthogonal to the main scan direction.

When the sheet P conveyed by the conveyance belt 28 sequentially passes below the five heads, colors of ink droplets are ejected from the plurality of ejection ports formed in the ejection plane toward an upper surface (a print surface) of the sheet P. A color image of a desired pattern is formed on the sheet P with color ink ejected from the four inkjet heads 12K, 12M, 12C, and 12Y. Further, as will be described later, a strip-shaped image, which contacts the color image formed with color ink, and which is invisible for the person is formed with colorless ink ejected from the inkjet head 12T.

A sheet sensor 31 which is a reflection-type optical sensor is interposed between the inkjet head 12T located at the most upstream position among the five inkjet heads, and the nip roller 24. When a leading end of the sheet conveyed along the conveyance path reaches a position immediately below the sheet sensor 31, the sheet sensor 31 outputs a detection signal.

Figure 2:
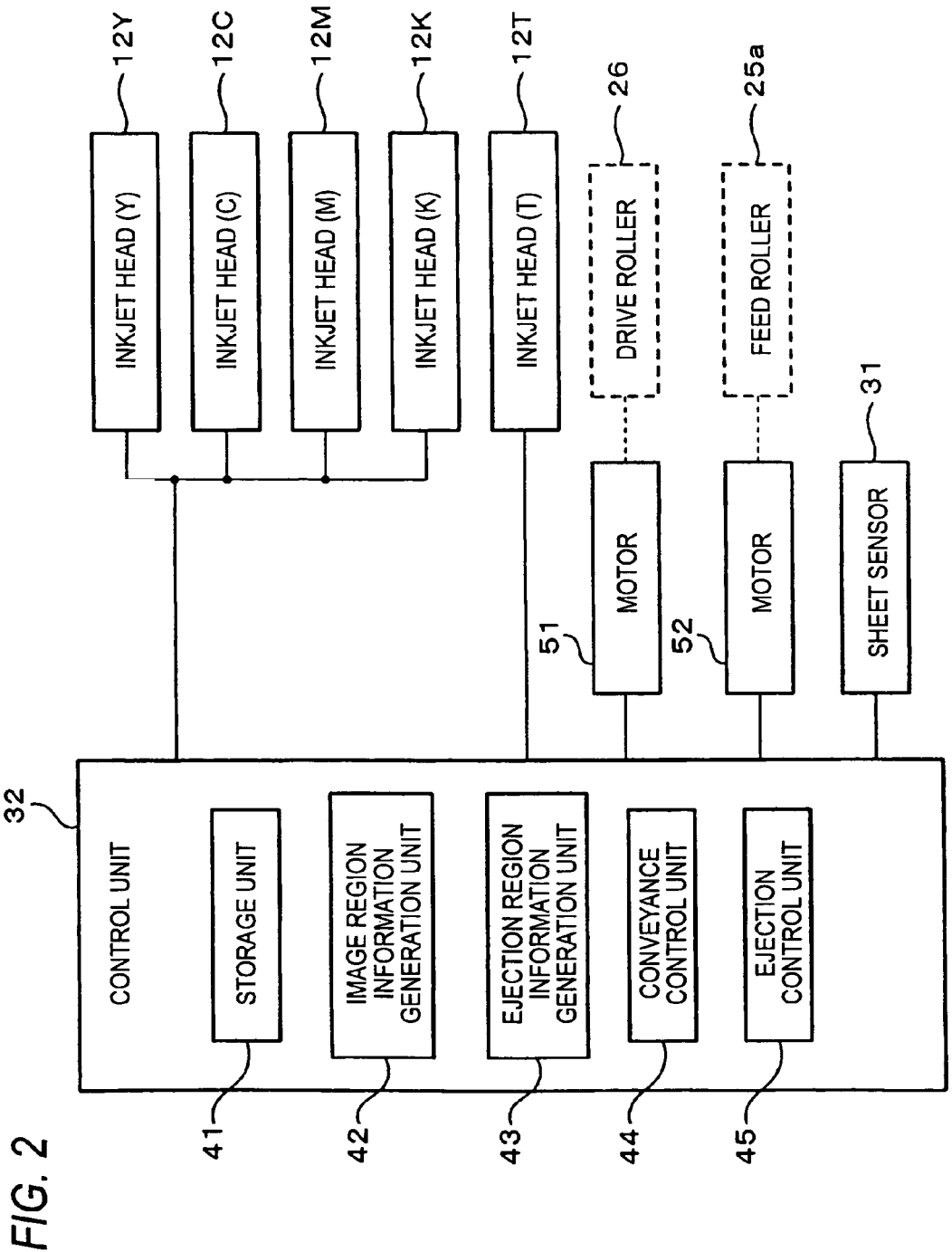
FIG. 2 is a functional block diagram of the inkjet printer shown in FIG. 1.

The inkjet printer 1 includes a control unit 32. The control unit 32 controls operations of respective units of the inkjet printer 1. The control unit 32 is configured by a plurality of hardwares, such as a Central Processing Unit (CPU), Random Access Memory (RAM), and Read Only Memory (ROM). Various types of software for controlling the inkjet printer 1 is stored in the ROM. As shown in FIG. 2, functional units, such as a storage unit 41, an image region information generation unit 42, an ejection region information generation unit 43, a conveyance control unit 44, and an ejection control unit 45, are provided in the control unit 32 by means of cooperative operation of the software and the hardware in the control unit 32.

The storage unit 41 stores image data in the form of, for instance, a bitmap, jpeg, and the like. The image data is sent from a host computer (not shown) and indicates a color image to be printed on the sheet P by the four ink jet heads 12K, 12M, 12C, and 12Y.

The image region information generation unit 42 generates, from the image data stored in the storage unit 41, information (image region information) regarding an area (extent) of an image region formed on the sheet P with color ink ejected over the sheet P from the four ink jet heads 12K, 12M, 12C, and 12Y Specifically, the image region information generation unit 42 first expands the image data stored in the storage unit 41 into drive data which allocates an amount of ink to each of the ejection ports in each print cycle. Next, the image region information generation unit 42 generates positional information regarding an impact area for each of lines extending in the main scan direction and provided for each interval corresponding to a print resolution in the sub-scan direction. The impact area is a sum of a plurality of minute substantially-circular segments which color inks are to reach in a virtual color image formed on the sheet P based on the drive data.

The size of each minute segment is almost equal to one dot formed on the sheet P with ink ejected from the ejection port. In other words, the size of the minute segment is substantially equal to a distance corresponding to the print resolution in the main scan direction, that is, the interval between the ejection ports in the main scan direction. A set of a plurality of positional information regarding the impact area of color ink generated per line is image region information. Drive data generated by the host computer and sent to the printer 1 may be stored in the storage unit 41 rather than the image region information generation unit 42 expanding image data into drive data.

The ejection region information generation unit 43 generates information (ejection region information) regarding an area of an ejection region contacting the image region based on the image region information generated by the image region information generation unit 42. In the present specification, the ejection region refers to an impact area of the colorless ink ejected from the inkjet head 12T, on the sheet P. Specifically, the ejection region information generation unit 43 generates positional information regarding an impact area of colorless ink contacting the impact area of the color ink on the sheet P, based on the image region information generated by the image region information generation unit 42 for each lines extending in the main scan direction and provided for each interval corresponding to the print resolution in the sub-scan direction. A set of a plurality of positional information regarding the impact area of the colorless ink generated per line is the ejection region information. It is noted that the ejection region contacting the image region is not limited to an area outside the whole image region. For example, if the image region has a ring shape, the ejection region contacting the image region includes an area outside the ring and an area inside the ring.

In the present exemplary embodiment, the ejection region has a strip shape extending along an edge of the image region. The width of the ejection region is substantially equal to a distance equivalent to the print resolution in the main scan direction, that is, the interval between the ejection ports in the main scan direction. Specifically, the ejection region is formed by arranging substantially-circular minute colorless ink segments having a diameter equivalent to the print resolution in the main scan direction, in a line along a contour of the image region. That is, the ejection region may be defined as a region along the contour of the image region. The size of the minute segment is substantially equal to the size of one dot formed on the sheet P by ink ejected from the ejection port.

The conveyance control unit 44 controls the motor 51 serving as a drive source for the belt roller 26 and the motor 52 serving as a drive source for the feed roller 25a.

In accordance with a detection signal of the leading edge of the sheet P from the sheet sensor 31, the ejection region information generated by the ejection region information generation unit 43, and the image data stored in the storage unit 41, the ejection control unit 45 controls the five inkjet heads 12T, 12K, 12M, 12C, and 12Y in synchronism with control of the motor 51 performed by the conveyance control unit 41. When a desired color image is formed on the sheet P with color ink, a strip-shaped image has been formed with colorless ink along the contour of the color image in the ejection region contacting the color image.

In the present exemplary embodiment, the inkjet head 12T is located at an upstream position from the four inkjet heads 12K, 12M, 12C, and 12Y in the conveyance direction. The ejection control unit 45 controls the five inkjet heads 12T, 12K, 12M, 12C, and 12Y so that before the color ink reach a minute segment in the image region, the colorless ink has reached a minute segment in the ejection region that is at the same position as the minute segment in the image region in the conveyance direction. Thereby, anywhere on the sheet P, the colorless ink ejected from the inkjet head 12T reaches the minute segment in the ejection region adjacent to the minute segment in the image region with the boundary interposed therebetween, before the color ink ejected from at least any one of the four inkjet heads 12K, 12M, 12C, and 12Y reaches the minute segment in the image region contacting the boundary between the image region and the ejection region.

Figure 3:
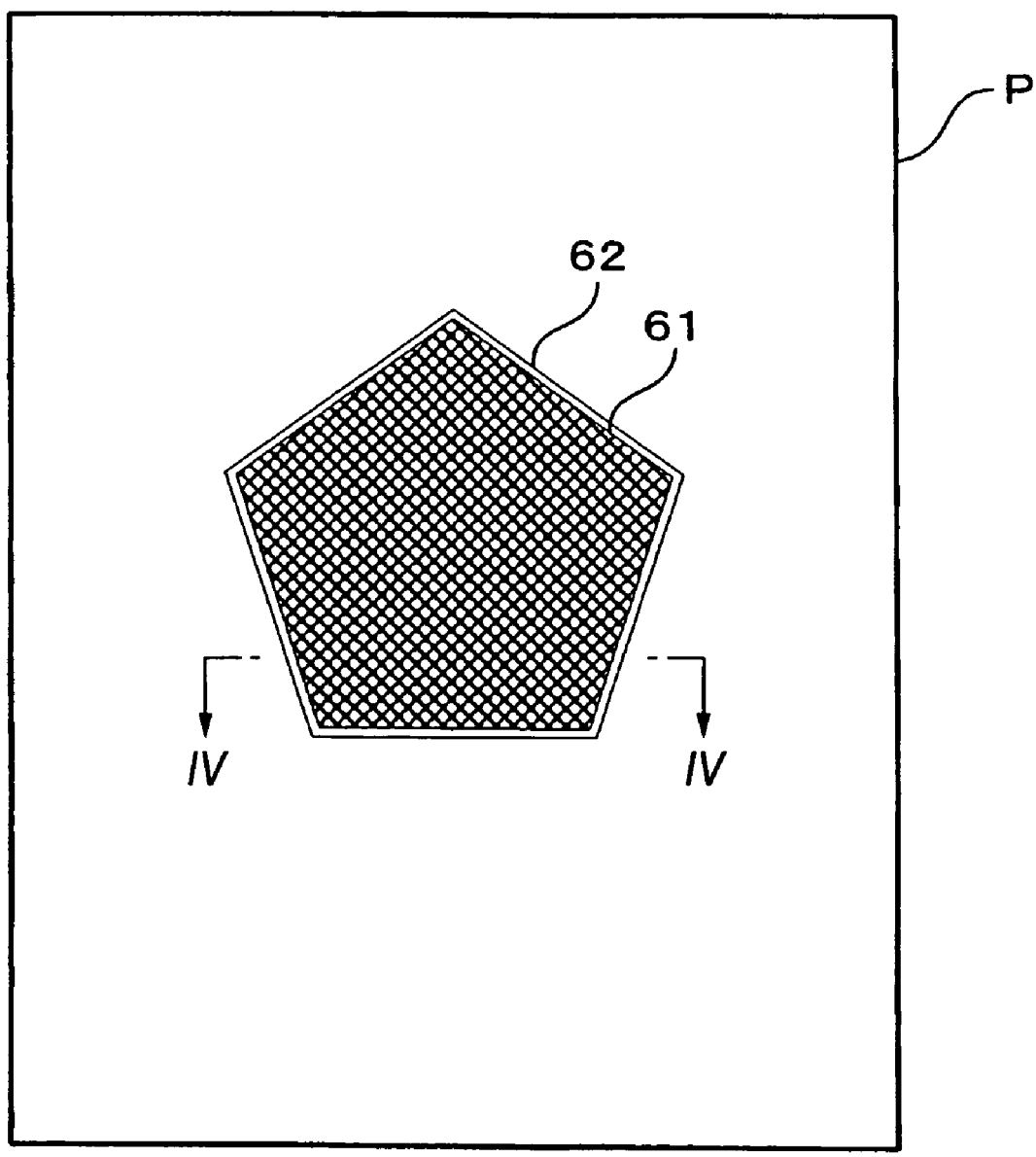
FIG. 3 is a drawing for describing an image region and an ejection region in a case where one equilaterally pentagonal figure is printed on a sheet as an example.

The image region and the ejection region are now described by taking a case where one equilaterally pentagonal figure is printed on the sheet P as an example. In FIG. 3, an equilaterally pentagonal area drawn by means of a meshed hatch pattern on the sheet P is the image region 61, and a strip-shaped area contacting the image region 61 is the ejection region 62. In FIG. 3, the width of the ejection region 62 is drawn so as to become greater than an actual ejection region.

Figure 4:
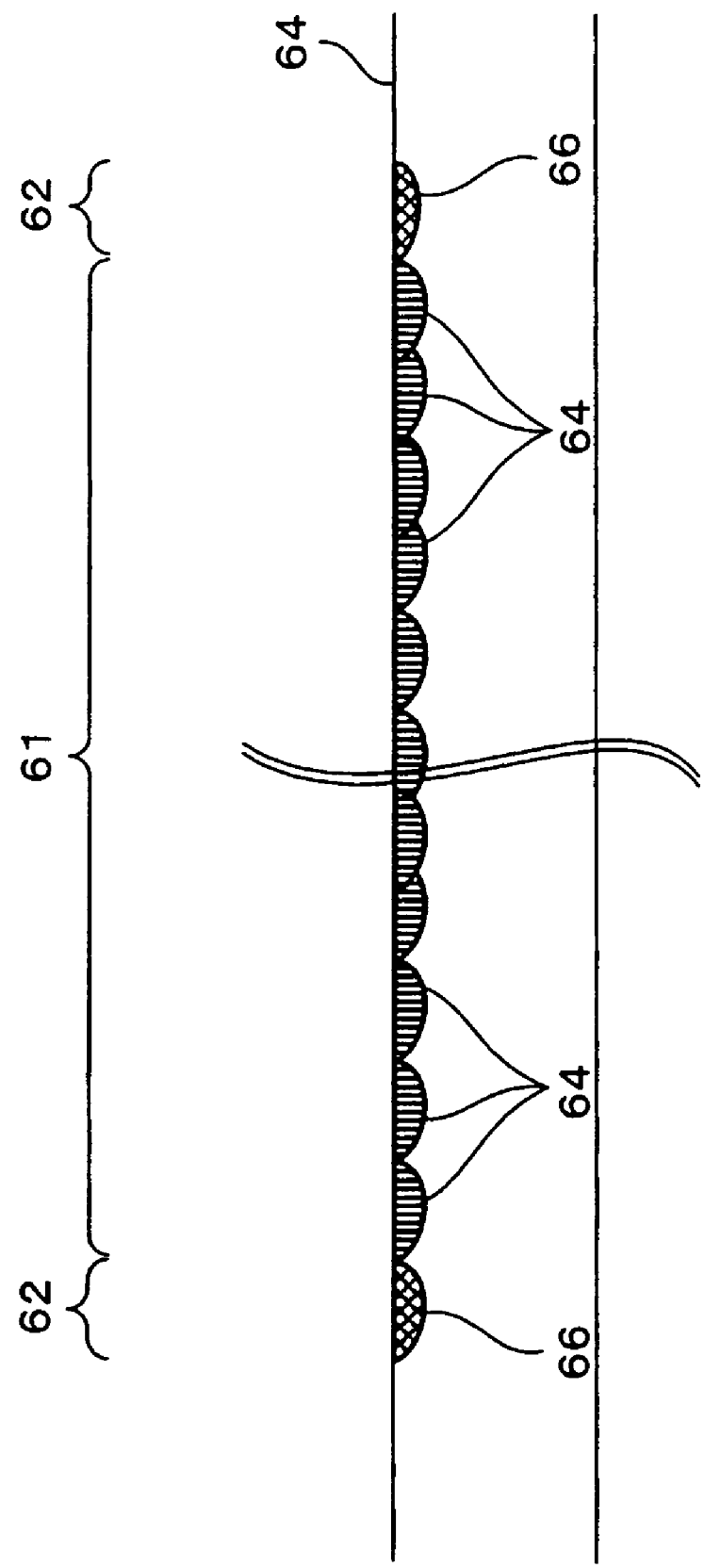
FIG. 4 is a schematic cross-sectional view taken along line IV-IV shown in FIG. 3.

FIG. 4 is a schematic cross-sectional view taken along line IV-IV shown in FIG. 3 (in parallel to the main scan direction during printing operation). In FIG. 4, a plurality of color ink dots 64 are formed in the image region 61 on the sheet P, without space therebetween. The respective color ink dots 64 permeate through the sheet P.

Moreover, colorless ink dots 66 are formed in the ejection region 62 on the sheet P. The colorless ink dots 66 adjoin the color ink dots 64 located at the outermost positions without space therebetween. The colorless ink dots 66 also permeate through the sheet P. The color ink dots 64 and the colorless ink dots 66 are formed in minute segments, each of which has a diameter substantially equal to an interval between the ejection ports in the main scan direction.

As described in the above, the colorless ink dots 66 are formed before formation of the color ink dots 64 in the cross-sectional view of FIG. 4. Therefore, the hydrophobic colorless ink dots 66 suppress the aqueous color ink dots 64 formed later than the hydrophobic colorless ink dots 66 from spreading over the sheet P.

Figure 5:
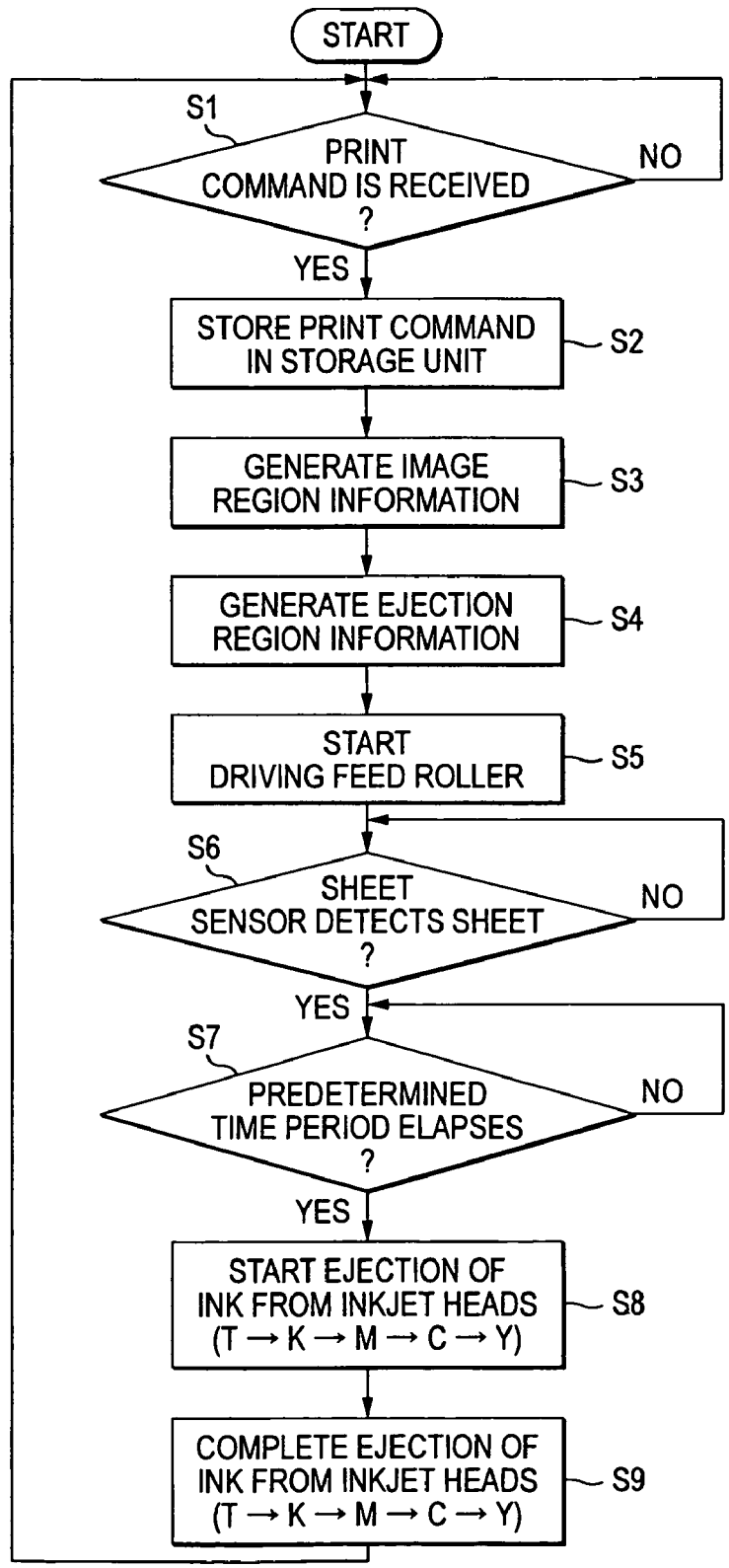
FIG. 5 is a flowchart showing print operation of the inkjet printer shown in FIG. 1.

Next, printing operation of the inkjet printer 1 of the present exemplary embodiment will now be described with reference to a flowchart of FIG. 5. In step S1, the control unit 32 repeatedly determines whether a print command is received from the host computer. When it is determined that the print command is received (YES in S1), the print command received in step S2 is stored in the storage unit 41. The print command includes the number of prints, layout information, and the like, as well as image data to be printed.

In step S3, the image region information generation unit 42 generates image region information from the image data stored in the storage unit 41. Subsequently, in step S4, the ejection region information generation unit 43 generates ejection region information based on the image region information generated by the image region information generation unit 42.

In step S5, the conveyance control unit 44 starts rotation of the motor 51. As a result, the feed roller 25a rotates, to thus start conveyance of the sheet P. In step S6, the control unit 32 repeatedly determines whether a detection signal of the leading end of the sheet P output from the sheet sensor 31 is received. When it is determined that the detection signal is received (YES in S6), processing proceeds to step S7. In step S7, elapse of a time period is waited. The time period corresponds to a quotient obtained by dividing a distance from the sheet sensor 31 to the inkjet head 12T along the conveyance direction by the speed at which the conveyance belt 28 conveys the sheet P.

In step S8, ejection of ink from the five inkjet heads 12T, 12K, 12M, and 12Y is started under control of the ejection control unit 45 in sequence of the inkjet head 12T, the inkjet head 12K, the inkjet head 12M, the inkjet head 12C, and the inkjet head 12Y.

Figure 6A:
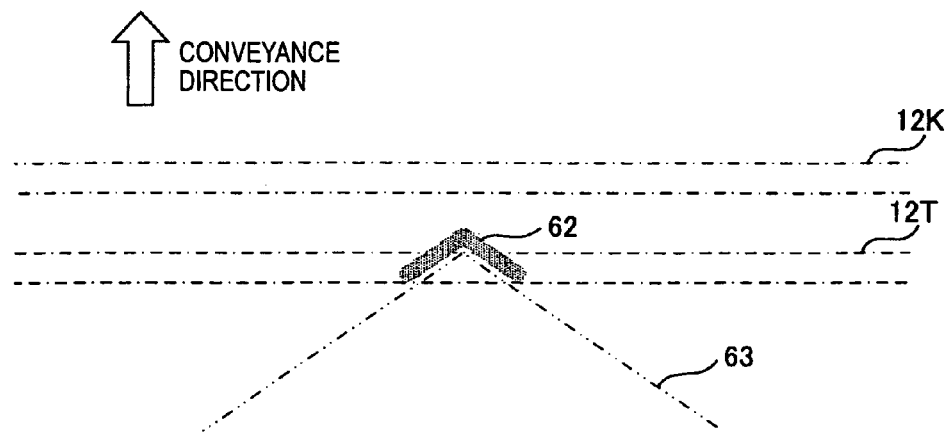
FIGS. 6A and 6B are schematic views sequentially showing arrival of ink on a sheet.
Figure 6B:
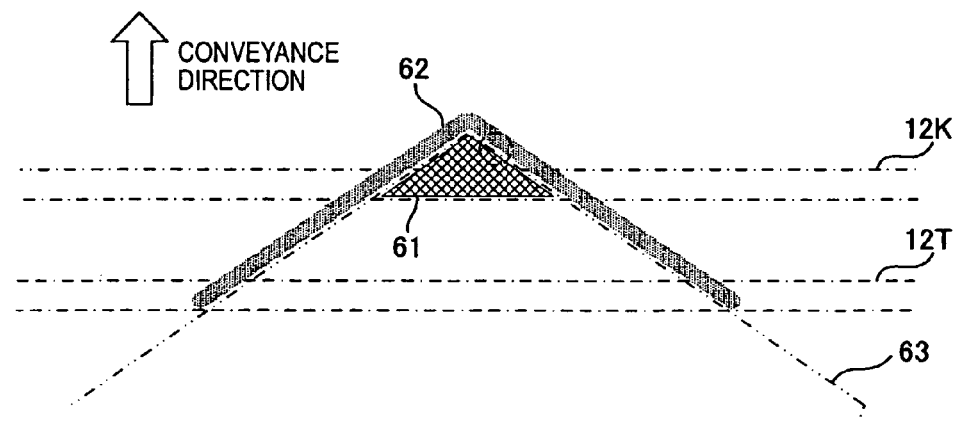

FIG. 6A is a schematic diagram showing arrival of ink on the sheet P at timing when the vicinity of the apex of the equilateral pentagon closest to the leading edge of the sheet P has reached the inkjet head 12T but not yet reached the inkjet head 12K in a case where the equilateral pentagon shown in FIG. 3 is printed in black ink. At this time, the strip-shaped ejection region 62 has been printed with the colorless ink ejected from the inkjet head 12T and in the shape of the letter V in the vicinity of the apex of the equilateral pentagon closest to the leading edge of the sheet P. In FIGS. 6A and 6B, a boundary between the image region 61 and the ejection region 62 is drawn with a two-dot chain line 63.

FIG. 6B is a schematic diagram showing arrival of ink on the sheet P at timing when a time has further elapsed from the timing of FIG. 6A and when the vicinity of the apex of the equilateral pentagon closest to the leading edge of the sheet P has reached the inkjet head 12K but not yet reached the inkjet head 12M. At this time, the V-shaped ejection region 62 formed in the shape of a strip in colorless ink has become larger than that drawn in FIG. 6A. A triangle image region 61 is printed in black ink in the vicinity of the apex of the equilateral pentagon closest to the leading edge of the sheet P.

Figure 7:
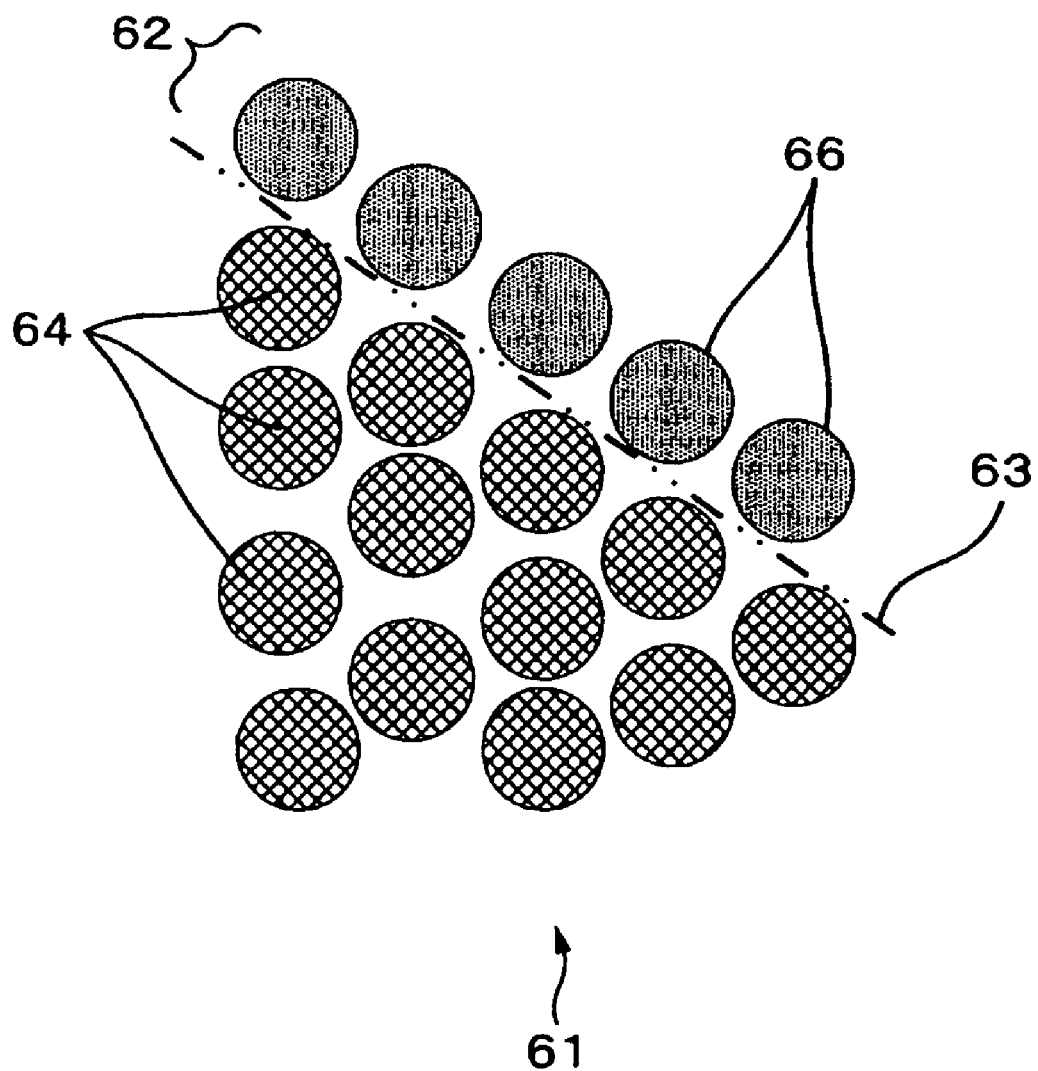
FIG. 7 is an enlarged view of a circle with broken line in FIG. 6B.

FIG. 7 is an enlarged view of the circle with broken line in FIG. 6B. In FIG. 7, a plurality of color ink dots 64 are two-dimensionally arranged, in either the main scan direction or the sub-scan direction, within the image region 61 at an interval substantially equal to the interval between the ejection ports in the main scan direction. The colorless ink dots 66 are arranged in a line along the two-dot chain line 63 serving as a boundary within the ejection region 62. It is noted that positions of the dots shown in FIG. 7 do not always accurately reflect an actual print result.

Consideration is now given to arbitrary colorless ink dots 66 in the ejection region 62 and two color ink dots 64 in the image region 61 adjacent to the ink dots 66 with the two-dot chain line 63 interposed therebetween. In the present exemplary embodiment, any of the colorless ink dots 66 is formed at earlier timing than the timing of formation of the color ink dot 64 adjacent to the colorless ink dot 66 of interest with the two-dot chain line 63 interposed therebetween. Accordingly, the hydrophobic colorless ink dots 66 suppress spreading of the aqueous color ink dots 64 over the sheet P in excess of the two-dot chain line 63.

Referring back to FIG. 5, in step S9, ejection of ink from the five inkjet heads 12T, 12K, 12M, 12C, and 12Y is sequentially completed under control of the ejection control unit 45 in sequence of the inkjet head 12T, the inkjet head 12K, the inkjet head 12M, the inkjet head 12C, and the inkjet head 12Y Processing returns to step S1.

According to the above-described exemplary embodiment, in any location on the sheet P, the colorless ink ejected from the inkjet head 12T reaches a minute segment in the ejection region adjacent to the minute segment in the image region with the boundary interposed therebetween before the color ink ejected from at least any one of the four inkjet heads 12K, 12M, 12C, and 12Y reaches the minute segment in the image region contacting the boundary between the image region and the ejection region. Therefore, the hydrophobic colorless ink dots 66 suppress spreading of the aqueous color ink dots 64 formed after the ink dots 66 over the sheet P. Therefore, even when highly-permeable color ink is used, permeation of color ink through the sheet P can be suppressed. As a consequence, it becomes possible to achieve improvement on both of print processing capability and formation of a sharp and clear image.

The storage unit 41, the image region information generation unit 42, and the ejection region information generation unit 43 are provided in the control unit 32. The ejection control unit 45 controls the inkjet head 12T in accordance with the information generated by the ejection region information generation unit 43. Accordingly, it can be ensured that the colorless ink reaches a position within the ejection region 62.

Additionally, in the present exemplary embodiment, the conveyance mechanism 23 relatively moves the sheet P with respect to the five inkjet heads 12T, 12K, 12M, 12C, and 12Y. Further, the ejection control unit 45 controls the five inkjet heads 12T, 12K, 12M, 12C, and 12Y so that the colorless ink reaches a minute segment within the ejection region 62, which is located at the same position as a minute segment in the image region 61 in the conveyance direction of the sheet P by the conveyance mechanism 23 before color ink reaches the minute segment within the image region 61. It is thereby possible to readily satisfy a condition (condition A) in which the colorless ink ejected from the inkjet heat 12T reaches a minute segment in the ejection region adjacent to a minute segment in the image region with the boundary interposed therebetween before color ink ejected from any one of the four inkjet heads 12K, 12M, 12C, and 12Y reaches the minute segment in the image region contacting the boundary between the image region and the ejection region, and control of the five inkjet heads 12T, 12K, 12M, 12C, and 12Y becomes easy.

Further, in the present exemplary embodiment, the sheet P is conveyed by the conveyance mechanism 23, and the inkjet head 12T that ejects colorless ink is fixed to an upstream position from the four inkjet heads 12K, 12M, 12C, and 12Y that eject color ink, in the direction of the sheet P conveyed by the conveyance mechanism 23. Since the condition A can be met by starting ejection of ink from the heads in a descending sequence from the most upstream inkjet head, complicate processing; for instance, a plurality of operations for reciprocally conveying a sheet, becomes obviated, and print processing capability can be improved further.

In the present exemplary embodiment, since the inkjet head 12T that ejects colorless ink is fixed to an upstream position from the inkjet head 12K that ejects black ink, permeation of black ink most noticeable among colors of ink can be readily suppressed.

Moreover, a size of each of the minute segments in the image region 61 corresponds to one dot of the color ink ejected from the inkjet heads 12K, 12M, 12C, and 12Y on the sheet P. Additionally, a size of each of the minute segments in the ejection region 62 corresponds to one dot of colorless ink ejected from the inkjet head 12T on the sheet P. Therefore, control becomes easy, and print processing capability can be further improved.

In the present exemplary embodiment, the ejection region information generation unit 43 generates information that the ejection region 62 has a strip shape which adjoins the image region 61 and has a certain width. Therefore, comparing with the case where all remaining area except the image region 61 is taken as the ejection region 62, the amount of colorless ink consumption can be reduced. Furthermore, in the present exemplary embodiment, the width of the strip-shaped area corresponds to one dot of colorless ink ejected from the inkjet head 12T on the sheet P. Therefore, the amount of colorless ink consumption can be further reduced.

While the present invention has been shown and described with reference to certain exemplary embodiments thereof, it will be understood by those skilled in the art that various changes in form and details may be made therein without departing from the spirit and scope of the invention as defined by the appended claims.

For instance, in the above-described exemplary embodiment, the color ink has aqueous property, and the colorless ink has hydrophobic property. However, the present invention is not limited thereto. Even if the color ink has hydrophobic property and colorless ink has aqueous property, an advantage analogous to that described in the above exemplary embodiment can be expected.

The ejection region does not always need to have a strip shape area contacting the image region. For instance, the ejection region may have an inverted shape of the image region. Any shape is applicable so long as the ejection region contacts the image region.

In the present exemplary embodiment, a line type inkjet printer is described. However, the present invention is not limited thereto. For example, the inventive concept of the present invention can be applied to a serial type inkjet printer in which a carriage mounted a plurality of inkjet heads thereon reciprocates in the main scan direction to thereby form an image on a sheet.

In the present exemplary embodiment, the colorless ink reaches a minute segment in the ejection region located at the same position of a minute segment in the image region in the conveyance direction, before the color ink reaches the minute segment in the image region. That is, with respect to a single line extending in the main scan direction, all minute segments in the ejection region are formed before formation of all minute segments of the image region in the same line. However, for example, if the serial type printer is employed, it is not necessary to satisfy this condition as long as satisfying the condition A in which the colorless ink ejected from the inkjet head 12T that ejects colorless ink reaches a minute segment in the ejection region adjacent to a minute segment in the image region with the boundary interposed therebetween, before the color ink ejected from the inkjet head that ejects color ink reaches the minute segment in the image region contacting the boundary between the image region and the ejection region.

In the above-described exemplary embodiment, the ejection region information is generated in step S4, and conveyance of the sheet P is started. However, the present invention is not limited thereto. The conveyance of the sheet P may be started after positional information about an impact area of colorless ink for at least the first line is generated.

The inkjet head 12T that ejects colorless ink may be fixed to a downstream position from the inkjet head 12K that ejects black ink.

What is claimed is:

1. An inkjet recording apparatus comprising:
    a first inkjet head configured to eject color ink having one of a hydrophobic property and an aqueous property;
    a second inkjet head configured to eject colorless ink having the other one of the hydrophobic property and the aqueous property; and
    an ejection controller which controls the first inkjet head to eject the color ink on an image region of a recording medium and controls the second inkjet head to eject the colorless ink on an ejection region contacting the image region with a boundary therebetween,
    wherein the ejection controller controls the first and second inkjet heads so that the colorless ink ejected from the second inkjet head reaches a second minute segment in the ejection region, the second minute segment adjacent to a first minute segment in the image region with the boundary interposed therebetween, before the color ink ejected from the first inkjet head reaches the first minute segment in the image region.

2. The inkjet recording apparatus according to claim 1, further comprising:
    a storage unit which stores image data;
    an image region information generation unit which generates information regarding an area of the image region based on the image data stored in the storage unit; and
    an ejection region information generation unit which generates information regarding an area of the ejection region based on the information generated by the image region information generation unit,
    wherein the ejection controller controls the second inkjet head according to the information generated by the ejection region information generation unit.

3. The inkjet recording apparatus according to claim 1, further comprising a moving mechanism which relatively moves the recording medium with respect to the first and second inkjet heads,
    wherein the ejection controller controls the first and second inkjet heads so that the colorless ink ejected from the second inkjet head reaches the second minute segment located at the same position as the first minute segment in a moving direction of the recording medium by the moving mechanism, before the color ink ejected from the first inkjet head reaches the first minute segment.

4. The inkjet recording apparatus according to claim 3,
    wherein the moving mechanism includes a conveyance mechanism which conveys the recording medium, and
    wherein the second inkjet head is fixed to an upstream position from the first inkjet head in a conveyance direction of the recording medium conveyed by the conveyance mechanism.

5. The inkjet recording apparatus according to claim 4,
    wherein the first inkjet head comprises a plurality of inkjet heads which eject ink of a plurality of colors, respectively, the colors including a black, and wherein the second inkjet head is fixed to the upstream position from the inkjet head which ejects black ink in the conveyance direction.

6. The inkjet recording apparatus according to claim 1,
    wherein a size of the first minute segment is equivalent to one dot of the color ink ejected from the first inkjet head on the recording medium,
    wherein a size of the second minute segment is equivalent to one dot of the colorless ink ejected from the second inkjet head on the recording medium.

7. The inkjet recording apparatus according to claim 1, wherein the ejection region information generation unit generates information indicating that the ejection region has a strip shape having a certain width and adjoins the image region.

8. The inkjet recording apparatus according to claim 7,
    wherein the width of the strip shape is equivalent to one dot of the colorless ink ejected from the second inkjet head on the recording medium.

9. An inkjet recording apparatus comprising:
    a first inkjet head configured to eject color ink having one of a hydrophobic property and an aqueous property;
    a second inkjet head configured to eject colorless ink having the other one of the hydrophobic property and the aqueous property; and
    an ejection controller which controls the first inkjet head to eject the color ink on an image region of a recording medium and controls the second inkjet head to eject the colorless ink on an ejection region contacting the image region with a boundary therebetween,
    wherein the ejection controller controls the second inkjet head to eject the colorless ink on a segment in the ejection region earlier than the first inkjet head ejecting the color ink on a segment in the image region, adjacent to the segment in the ejection region.

10. An inkjet recording method comprising:
    ejecting color ink having one of a hydrophobic property and an aqueous property from a first inkjet head on an image region of a recording medium;
    ejecting colorless ink having the other one of the hydrophobic property and the aqueous property from a second inkjet head on an ejection region contacting the image region with a boundary therebetween;
    wherein the colorless ink ejected from the second inkjet head reaches a second minute segment in the ejection region, the second minute segment adjacent to a first minute segment in the image region with the boundary interposed therebetween, before the color ink ejected from the first inkjet head reaches the first minute segment in the image region.

11. The inkjet recording method according to claim 10, further comprising:
    generating information regarding an area of the image region based on image data stored in a storage unit; and
    generating information regarding an area of the ejection region based on the information generated regarding an area of the image region,
    wherein the colorless ink ejected from the second inkjet head is ejected according to the information generated regarding an area of the ejection region.

12. The inkjet recording method according to claim 10, further comprising:
    relatively moving the recording medium with respect to the first and second inkjet heads,
    wherein the colorless ink ejected from the second inkjet head reaches the second minute segment located at the same position as the first minute segment in a moving direction of the recording medium, before the color ink ejected from the first inkjet head reaches the first minute segment.

13. The inkjet recording method according to claim 12, wherein relatively moving the recording medium comprises conveying the recording medium with a conveyance mechanism, and wherein the second inkjet head is fixed to an upstream position from the first inkjet head in a conveyance direction of the recording medium conveyed by the conveyance mechanism.

14. The inkjet recording method according to claim 13, wherein the first inkjet head comprises a plurality of inkjet heads, and wherein ejecting color ink from the first inkjet head comprises ejecting ink of a plurality of colors from the plurality of inkjet heads, respectively, the colors including a black, and wherein the second inkjet head is fixed to the upstream position from the inkjet head which ejects black ink in the conveyance direction.

15. The inkjet recording method according to claim 10, wherein a size of the first minute segment is equivalent to one dot of the color ink ejected from the first inkjet head on the recording medium, and wherein a size of the second minute segment is equivalent to one dot of the colorless ink ejected from the second inkjet head on the recording medium.

16. The inkjet recording method according to claim 10, wherein generating information regarding an area of the ejection region comprises generating information indicating that the ejection region has a strip shape having a certain width and adjoins the image region.

17. The inkjet recording method according to claim 16, wherein the width of the strip shape is equivalent to one dot of the colorless ink ejected from the second inkjet head on the recording medium.

* * * * *